(12) United States Patent
Kaneko et al.

(10) Patent No.: US 6,990,435 B2
(45) Date of Patent: Jan. 24, 2006

(54) TACTILE SENSING METHOD AND SYSTEM

(75) Inventors: Makoto Kaneko, Hiroshima-ken (JP); Ryuta Horie, Hiroshima-ken (JP)

(73) Assignee: Harmonic Drive Systems Inc., Tokyo (JP)

( * ) Notice: Subject to any disclaimer, the term of this patent is extended or adjusted under 35 U.S.C. 154(b) by 95 days.

(21) Appl. No.: 10/674,538

(22) Filed: Oct. 1, 2003

(65) Prior Publication Data

US 2004/0125079 A1 Jul. 1, 2004

(30) Foreign Application Priority Data

Oct. 10, 2002 (JP) ............................ 2002-297626
Jan. 21, 2003 (JP) ............................ 2003-011770

(51) Int. Cl.
*H04B 15/00* (2006.01)
(52) U.S. Cl. ................... 702/189; 702/103; 702/66; 901/46; 340/665; 434/113; 434/114; 84/734; 73/861.06; 708/5
(58) Field of Classification Search ................ 702/57, 702/66, 75, 103–104, 189–195; 901/46; 340/665; 434/113–114; 84/734; 73/75, 73/861.06; 708/5
See application file for complete search history.

(56) References Cited

U.S. PATENT DOCUMENTS 3,736,672 A * 6/1973 Skewis et al. ............... 434/114
5,588,839 A * 12/1996 Shimoda ...................... 434/114
5,714,808 A * 2/1998 Ansel et al. .................. 307/116
6,580,417 B2 * 6/2003 Rosenberg et al. .......... 345/157

OTHER PUBLICATIONS

West et al., 'Detection of Real and Virtual Fine Surface Features with a Haptic Interface and Stylus', Nov. 1997, ASME, pp. 1-8.*
Paradiso et al., 'Musical Applications of Electric Field Sensing', Apr. 1996, Computer Muscial Journal, pp. 1-28.*
CRC, 'Chapter 2: Metaphors and Senses', pp. 56-75.*

* cited by examiner

*Primary Examiner*—Marc S. Hoff
*Assistant Examiner*—Elias Desta
(74) *Attorney, Agent, or Firm*—Burns, Doane, Swecker & Mathis, L.L.P.

(57) ABSTRACT

A system for detecting tactile information includes strain-gauge touch sensors and a controller. Based on the sum output from each of tough-sensor sensor units, an analyzer in the controller calculates touch force $F_t(t)$ at each measurement point. An automatic gain control adjusts the voltage amplitude $A_i(t)$ of a sine wave of frequency $f_i$ applied to the sensor units at each measurement point to bring the voltage amplitude measured at each measurement point in line with a target voltage. The adjusted voltage $A_i(t)$ is applied to the bandpass filter with a composite sine wave $y(t)$ which includes sine waves of each frequency corresponding to the adjusted voltage amplitude $A_i(t)$. This makes it possible to reduce the number of lines between the controller and touch sensors that includes numerous measurement points, and enables the gain of the touch sensors constituted by strain gauges to be controlled within an appropriate range.

2 Claims, 11 Drawing Sheets

$y(t) = A_1 \sin(2\pi f_1 t) + A_2 \sin(2\pi f_2 t) + \cdots + A_i \sin(2\pi f_i t) + \cdots$ (Controller output signal)

Sensor output waveform

313 Hz amplitude

604 Hz amplitude

TACTILE SENSING METHOD AND SYSTEM

BACKGROUND OF THE INVENTION

1. Technical Field

The present invention relates to an automatic adjustment type method and system for detecting tactile information in which sensitivity can be automatically adjusted in accordance with outputs of strain gauges constituting sensor elements adhered to measurement locations.

2. Related Art

Human skin has various types of touch receptors that enable it to distinguish touches ranging from light touches to impact forces. There are approximately 1500 Meissner's tactile corpuscles and 750 Merkel's tactile disks per square centimeter in the upper part of the skin of the fingertip, and some 75 Pacinian corpuscles and Ruffini endorgans per square centimeter. These four types of touch receptors, with their different time and spatial responses, provide a broad measuring range.

In an environment in which people and robots coexist, it is considered that the robots would have to be equipped with touch sensors that continuously measure over an appropriate range. For example, high-sensitivity touch sensors may be required if robotic fingertips are used to carry out delicate tasks. On the other hand, to avoid dangers, sensors may be required that can also measure large impact forces.

Research into robotic touch sensors started around 1960 with the work of H. Erunst and others. Since that time, numerous touch sensors have been proposed from various perspectives, and have been improved with respect to, for example, sensitivity, resolution, linearity, reduced-wiring configurations, mounting, and so forth.

A method that is widely used in the prior art is to arrange touch sensors in an (M×N) matrix and sequentially switch from sensor to sensor to measure tactile information at each sensor measurement point where each touch sensor is arranged. A drawback of these touch sensors is that it requires many wires to read the information at the measurement points. To reduce the number of wires, Shinoda and others, for example, have proposed new types of wireless sensing configurations that use coils for electric power transmission and sensing. Comprising numerous resonance circuits set in a flexible material, these sensors can distinguish which portion is touched.

A problem with conventional touch sensors is that sensor resolution is degraded by an input of a strong signal exceeding a prescribed level, which causes saturation, or when a touch force is a very small one. To overcome this, the touch sensors require automatic gain control (hereinbelow, AGC) to automatically adjust a gain to a level appropriate to a sensor input.

Also, with respect to using touch sensors over a large area, since the touch force input to sensor elements is not uniform, there may be parts that become saturated, degrading the resolution. To prevent this, it should be made possible to individually adjust the sensor element gain at each measurement point. Also, when wired touch sensors are used, it should be made possible to reduce the number of wires that run between the measurement point sensor elements and a controller used to detect the tactile information at each measurement point, from outputs of the sensor elements.

DISCLOSURE OF THE INVENTION

An object of the present invention is to provide a method and system for detecting tactile information that can automatically adjust a gain of each strain gauge (sensor element) disposed at each measurement point, in accordance with a touch force acting on the strain gauge.

Another object is to provide a method and system for detecting tactile information that also makes it possible to reduce the number of wires between the touch sensor and the controller.

To attain the above object, the present invention provides a method for detecting tactile information on touch force and the like acting on measurement points, based on outputs from bridge circuits constituted by strain gauges adhered to each measurement point, said method comprising:

generating a composite sine wave signal that contains sine wave components having different frequencies;

applying the composite sine wave signal to each bridge circuit via a bandpass filter to apply to each bridge circuit a sine wave signal of a predetermined single frequency;

adding outputs from each bridge circuit to generate a sum output;

from the sum output, utilizing trigonometric function orthogonality to obtain at least touch force of touch force and touch direction acting on each measurement point;

comparing voltage amplitude measured at each measurement point to a reference voltage preset for each measurement point and adjusting the voltage amplitude of the sine wave signal of each frequency applied to the bridge circuit of each measurement point to control the gain of the bridge circuit of each measurement point to reduce any difference between measured and reference voltages.

The object is also attained by a system for detecting tactile information on touch force and the like acting on measurement points according to the above method, said system comprising:

a touch sensor, a controller, a signal output line for supplying the sum output of the touch sensor to the controller, and a gain control line for supplying the composite sine wave signal output of the controller to the touch sensor;

the touch sensor including a plurality of sensor units, and an adding circuit for generating the sum output by adding the output from each sensor unit;

each touch sensor including the bridge circuit constituted by a plurality of strain gauges disposed at a measurement point, and a bandpass filter for applying to the bridge circuit a sine wave signal of a predetermined single frequency included in the composite sine wave signal;

the controller including an A/D converter for A/D conversion of the sum output supplied via the signal output line, an analyzer that, from the sum output converted by the A/D converter, of the touch force and touch direction acting on each measurement point, utilizes trigonometric function orthogonality to obtain at least the touch force acting on each measurement point, an automatic gain control circuit that compares voltage amplitude measured at each measurement point to a reference voltage preset for each measurement point and adjusts the voltage amplitude of each sine wave signal frequency applied to each sensor unit of the touch sensor to reduce any difference between the measured and reference voltages, and a D/A converter that generates and outputs a composite sine wave that includes sine wave signals of each frequency with the voltage amplitude thus adjusted.

In accordance with the present invention, a variable-sensitivity system for detecting tactile information is achieved that uses a one-input, one-output interface between the touch sensor and the controller and enables the gain of a plurality of sensor elements (sensor units) to be individually controlled.

That is, using a one-input, one-output interface between the touch sensor and the controller enables simultaneous measurement at the measurement points and at the same time enables the gain of the detection signal from each measurement point to be adjusted.

Moreover, simple signal processing by the analyzer makes it possible to measure the force acting on each measurement point on a real-time basis.

In addition, the strength of the signals from the touch sensors is constantly maintained within a fixed range, preventing touch sensor saturation and degradation of sensor resolution. Thus, appropriate sensing is always carried out.

BEST MODE FOR CARRYING OUT THE PRESENT INVENTION

Details of a system for detecting tactile information with sensitivity that can be automatically adjusted will now be described, with reference to the drawings.

Figure 1:
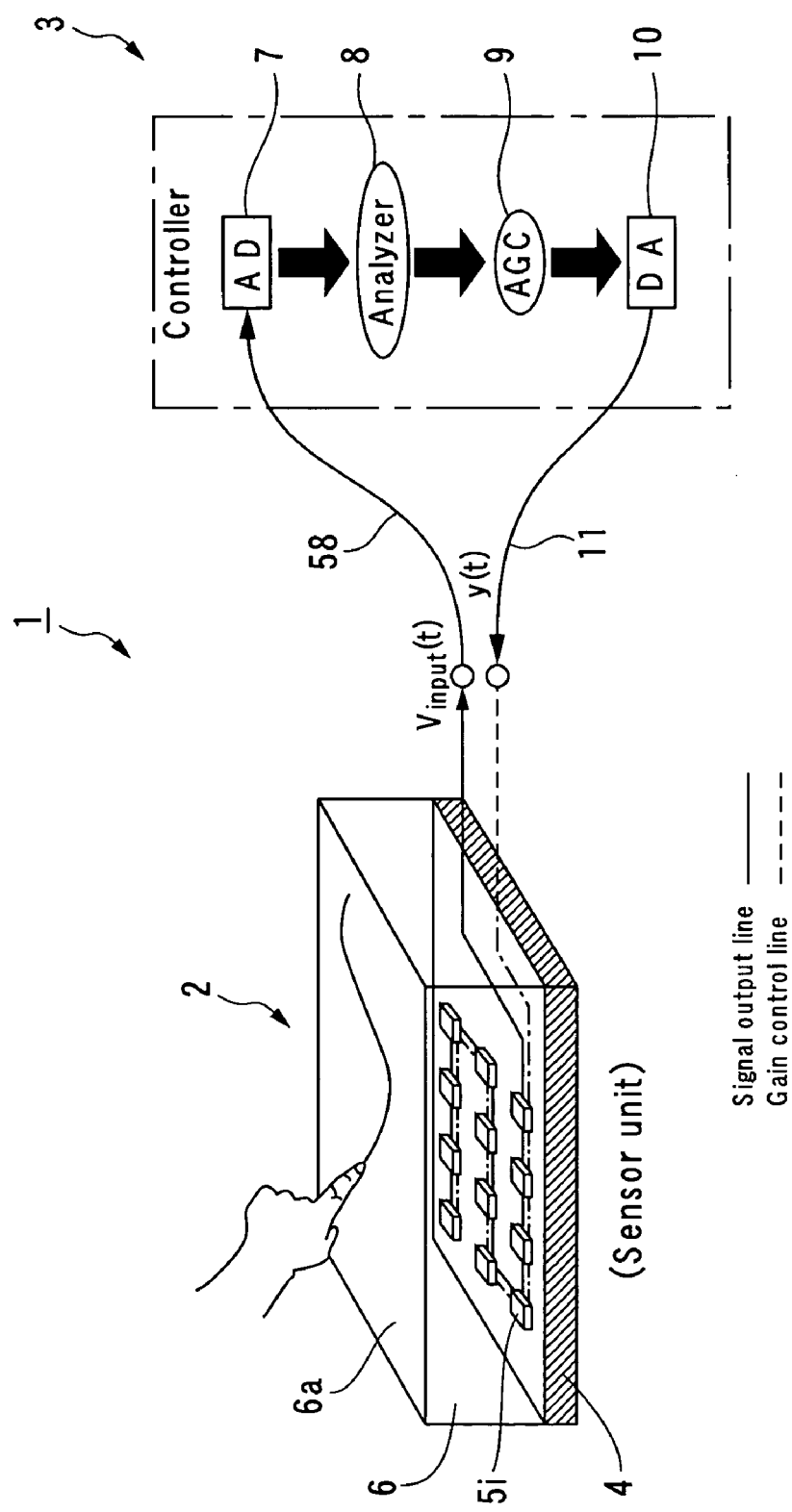
FIG. 1 is a block diagram illustrating a system for detecting tactile information according to the present invention.
Figure 2:
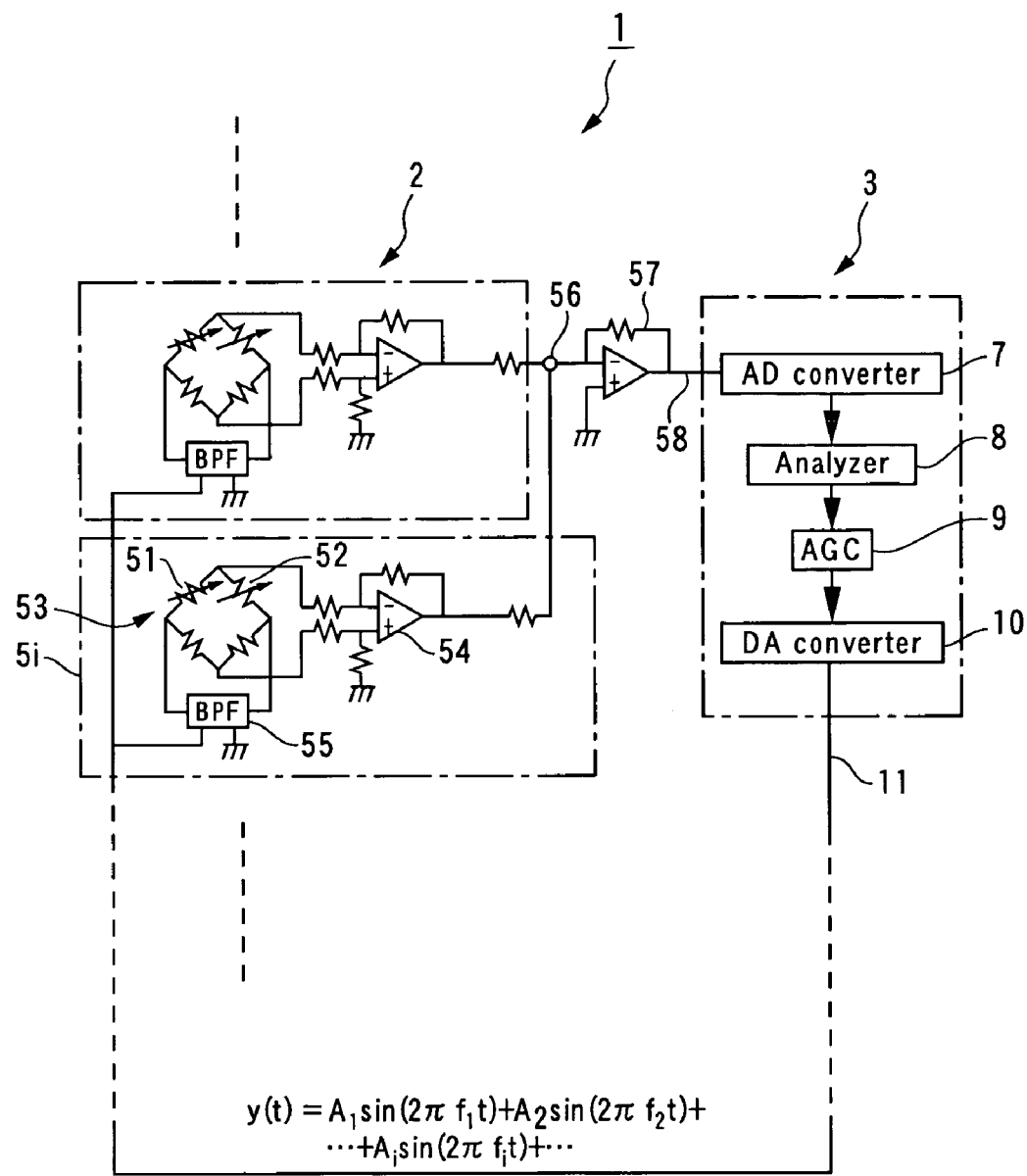
FIG. 2 is a block diagram illustrating a circuit configuration of a sensor unit used in the system of FIG. 1.

FIG. 1 shows an overall configuration of the system for detecting tactile information, and FIG. 2 is a block diagram illustrating a circuit configuration of a touch sensor used in the system. A tactile information detection system 1 has a strain gauge type touch sensor 2 and a controller 3. The touch sensor 2 has a sensor substrate 4, a plurality of sensor units 5$i$ (i=1, 2, 3 . . . ) arranged in a matrix on a surface of the sensor substrate 4, and a detection surface 6$a$ formed of a flexible material 6 such as a polymer gel or the like that covers the sensor units 5$i$.

Each sensor unit 5 includes a bridge circuit 53 comprised by a pair of strain gauges 51 and 52, disposed orthogonally to points corresponding to measurement points of the detection surface 6$a$, a differential amplifier 54 that generates a differential signal from an output of the bridge circuit 53, and a bandpass filter (BPF) 55 for applying an input signal of a specific wavelength to the bridge circuit 53. The touch sensor 2 also includes an adding circuit 56 that combines outputs of the sensor units 5 (differential amplifier 54 output) and an amplifier 57 that amplifies a composite signal obtained by means of the adding circuit 56, and supplies an output of the amplifier 57 to the controller 3, via a single signal output line 58. The controller 3 includes an A/D converter 7, an analyzer 8, an automatic gain control circuit (hereinafter AGC) 9 and a D/A converter 10. A gain control signal output by the D/A converter 10 is supplied, via a single gain control line 11, to each of the sensor units 5 of the touch sensor 2.

Figure 3:
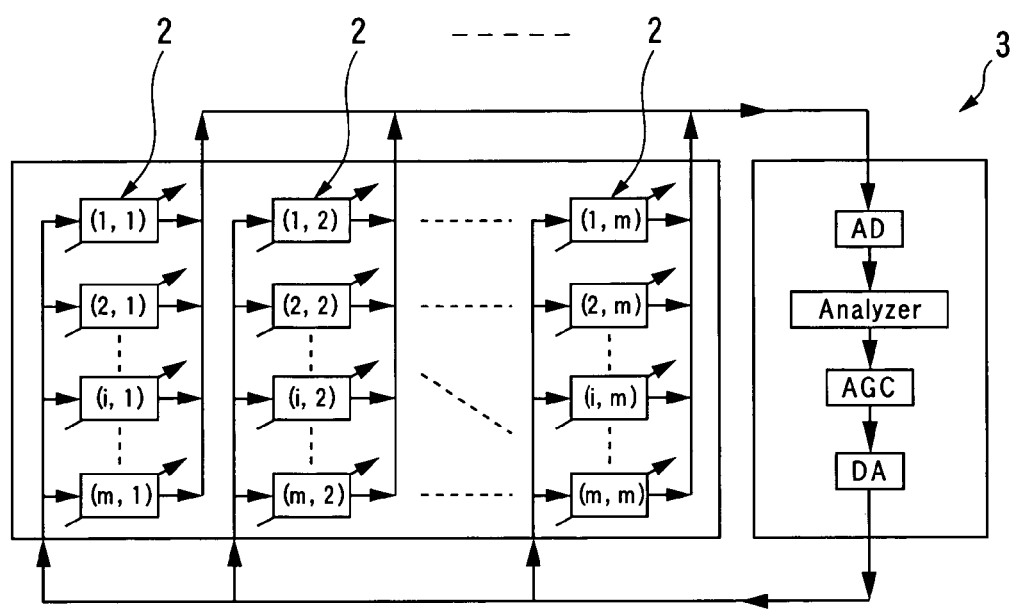
FIG. 3 shows an example of the system configuration of FIG. 1 equipped with plural sets of touch sensors.

The number of measurement points can be increased by, for example, connecting plural sets of touch sensors 2 in parallel with the controller 3, as shown in FIG. 3. The tactile information detection system 1 is able to measure tactile information (touch force, in this example) while at the same time controlling the gain of each of the sensor units 5 of the touch sensor 2. To control the gain, the sum of sine waves of different frequencies (composite sine wave signal) is output from the D/A converter 10 of the controller 3 as gain control signal y(t). Thereby, via the bandpass filter (BPF) 55, at each sensor unit 5 disposed at each measurement point, a gain control signal that includes only sine wave components of predetermined frequency is imposed on the bridge circuit 53. As a result, the gain is adjusted, as described below.

An amplitude $A_i$ of the signal $V_i(t)$ output from the bridge circuit 53 of the sensor unit 5$i$ is proportional to a strength of an input to the sensor unit 5$i$, and each output is multiplexed by the adding circuit 56. This makes it possible for detection outputs from a plurality of measurement points to be collectively A/D converted by the A/D converter 7 of the controller 3. By thus using a one-input, one-output configuration, by means of the D/A converter 10, the controller 3 can readily measure touch force and other such tactile information at a plurality of measurement points, and adjust the gain.

Processing operations of the analyzer 8 and AGC 9 of the controller 3 will now be described. To enable force information at the measurement points to be calculated on a real-time basis, the analyzer 8 carries out Fourier transformation and equivalence processing on an i-channel by i-channel basis. At the AGC 9, continuous gain control is exercised to adjust a signal from the sensor unit 5$i$ of the touch sensor 2 to a reference (target) value. The function of the AGC 9 is to try and maintain a signal within a fixed range, to thereby avoid an unstable state in which measurement is not possible. If, for example, a very large touch force is imposed on a particular measurement point, the AGC 9 reduces the amplitude $A_i$ of a sine wave that controls the gain of the sensor unit 5$i$ located at that measurement point. In this way, the signal $V_i(t)$ output from the sensor unit 5$i$ is kept within a specified range. When the touch force acting on a measurement point is a small one, the AGC 9 increases the amplitude $A_i$ of the sine wave concerned, to thereby also keep the signal $V_i(t)$ from the sensor unit 5$i$ within the specified range and increase the gain.

Automatic gain control is used on CCD cameras and microphone amplifiers and the like to maintain signal strength within a fixed range, in cases in which an input signal is above or below a prescribed level. In the case of the present invention, from the perspective of measurement, a new tactile information detection system 1 is realized that incorporates an AGC function.

Figure 4:
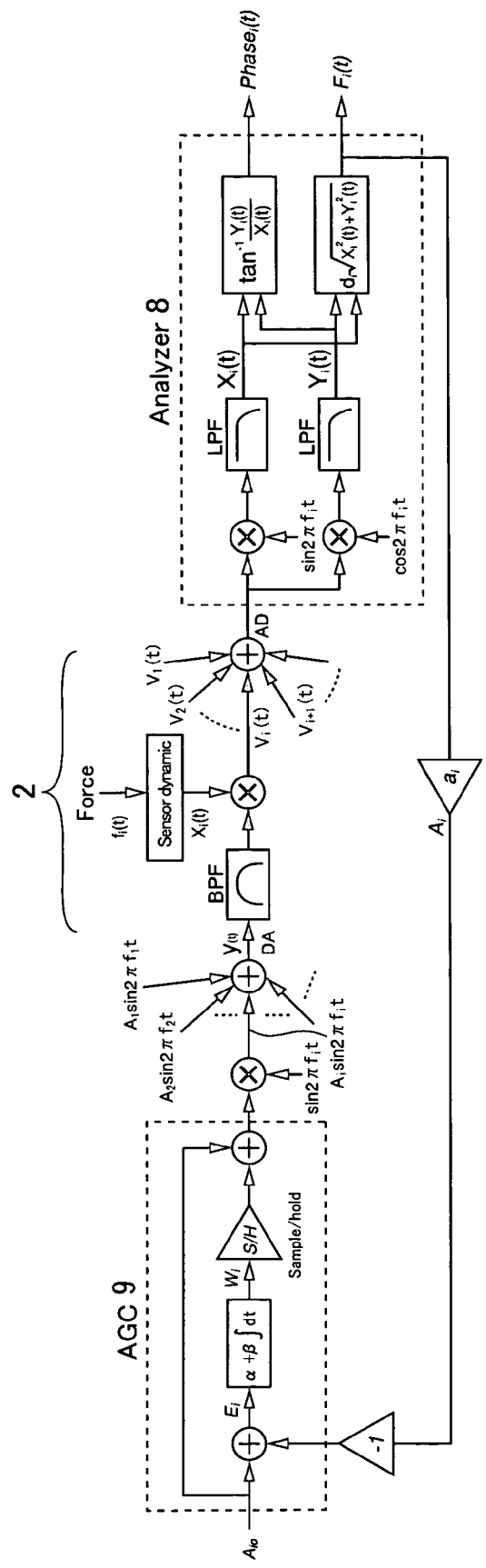
FIG. 4 is a block diagram of a signal feedback loop of the ith sensor unit used in the system of FIG. 1.

FIG. 4 is a block diagram of a signal feedback loop of the ith sensor unit 5$i$. This shows a signal flow between the touch sensor 2 and the controller 3. To enable the gain of the measurement point sensor unit 5$i$ to be simultaneously controlled from the controller 3 side, the sum of the different-frequency sine waves is output by the D/A converter 10. The composite sine wave y(t) is expressed by equation (1).

$$y(t) = A_1\sin(2\pi f_1 t) + A_2\sin(2\pi f_2 t) + \cdots + A_i\sin(2\pi f_i t) + \cdots \quad (1)$$

$A_i$ and $f_i$ are the ith voltage amplitude and frequency. As expressed in the above equation, the composite sine wave signal y(t) is imposed on the bridge circuit 53 at each of the measurement points, but because of the presence of the bandpass filter (BPF) 55, only sine wave components of a predetermined single frequency fi are imposed on the bridge circuit 53. Thus, only $A_i \sin(2\pi f_i t)$ is imposed on the ith bridge circuit 53; when the strain gauges 51 and 52 are subjected to a force, the output voltage $V_i(t)$ from the ith sensor unit 5$i$ is as shown by equation (2).

$$V_i(t) = G_i \times \frac{\Delta R_i}{2R} A_i \sin(2\pi f_i t + \phi_i) \quad (2)$$

Here, $G_i$ is a gain of the differential amplifier 54, $\phi_i$ is a phase deviation from an applied frequency, $\Delta R_i$ is a change in resistance of the strain gauges 51 and 52 produced by the touch force, and R is balance resistance of the bridge circuit 53. As shown by this equation, since the gain $G_i$ of the differential amplifier 54 is fixed, the gain of the sensor unit 5$i$ can be changed from the controller 3 side by changing the voltage amplitude $A_i$ applied to the bridge circuit 53. The signals $V_i(t)$ output from the measurement points are multiplexed by the adding circuit 56 and at the same time can be measured by the controller 3. Equation (3) expresses the signal $V_{input}(t)$ input to the controller 3.

$$V_{input}(t) = \sum_{i=1}^{n} V_i(t) \quad (3)$$

$$|V_{input}(t)| < V_{input}|_{max}$$

Here, $V_{input|max}$ is a maximum input voltage to the A/D converter 7 or the like. The force imposed on each of the measurement points is calculated by the analyzer 8, but a force that exceeds the maximum input voltage cannot be thus calculated. Therefore, the AGC 9 is used to appropriately control the gain to keep the $V_i(t)$ signal strength within a fixed range. Forming a gain control feedback makes it possible to prevent signal saturation when a force input to the sensor unit 5$i$ exceeds the prescribed value, and when an input force is small, resolution can be raised by increasing the gain until the input is within the prescribed range. That is, the signal level can be maintained within a fixed range, preventing the system falling into an unstable state in which measurement is not possible. The analyzer 8 and AGC 9 will now be described in further detail.

(Analyzer)

Figure 5A:
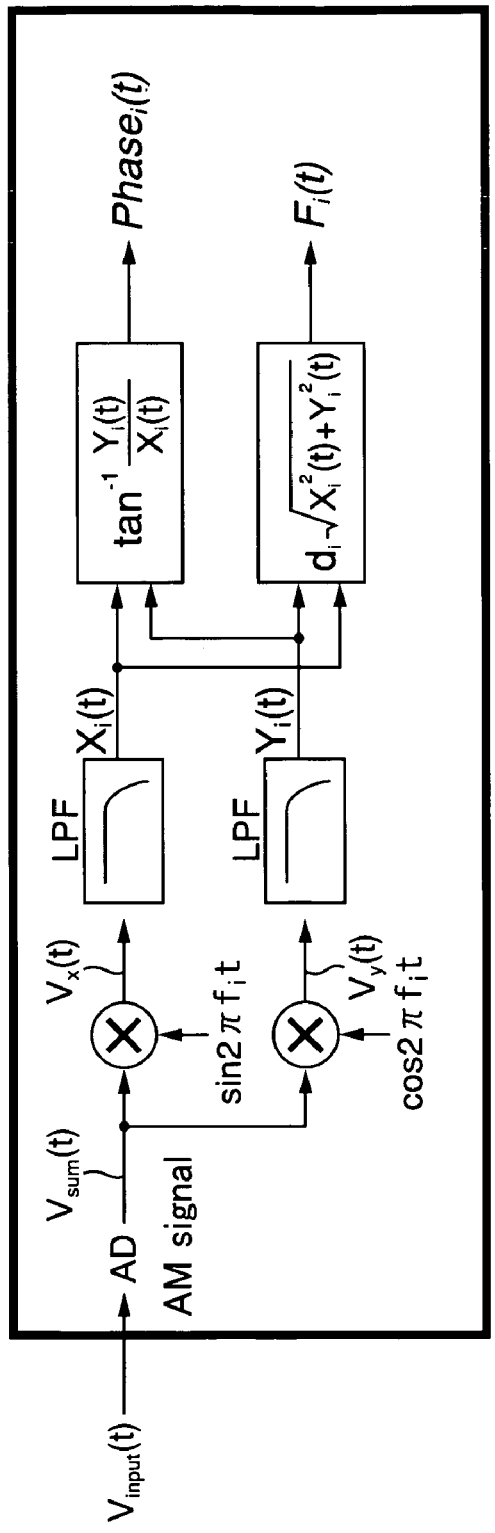
FIG. 5A is a block diagram illustrating processing of the analyzer used in the system of FIG. 1.

As shown in FIGS. 4 and 5A, the output $V_i(t)$ from the sensor unit 5$i$, as shown in equations (2) and (3), includes frequency components that are amplitude-modulated in accordance with the force acting on the measurement points. Therefore, the force acting on the measurement points can be obtained by demodulation, as follows. A frequency (carrier wave) applied to the each of the measurement points is know beforehand, so it is only necessary to obtain a relationship between a requisite frequency and amplitude. Equations (4) and (5) show how a correlation between the sine wave and cosine wave is obtained with respect to the output $V_{sum}(t)$ obtained by the A/D conversion of the output $V_{input}$.

$$V_x(t) = V_{sum}(t) \times \sin(2\pi f_i t) \quad (4)$$

$$V_y(t) = V_{sum}(t) \times \sin\left(2\pi f_i t + \frac{\pi}{2}\right) \quad (5)$$

If respective low-pass filter (LPF) is applied to the $V_x(t)$ and $V_y(t)$ thus obtained to give $X_i(t)$ and $Y_i(t)$, an amplitude of the frequency concerned, that is, a touch force $F_i(t)$ can be written as follows.

$$F_i(t) = d_i \overline{\sqrt{X_i^2(t) + Y_i^2(t)}} \quad (6)$$

$$Phase_i(t) = \arctan \frac{X_i(t)}{Y_i(t)} \quad (7)$$

Figure 5C:
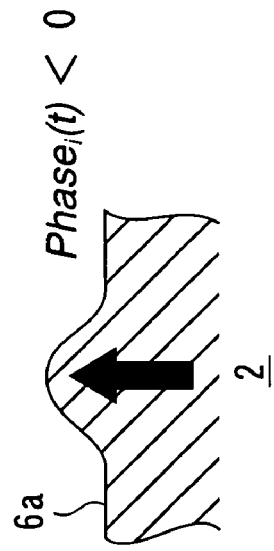
FIG. 5C illustrates the significance of the upward phase obtained by the analyzer.
Figure 5B:
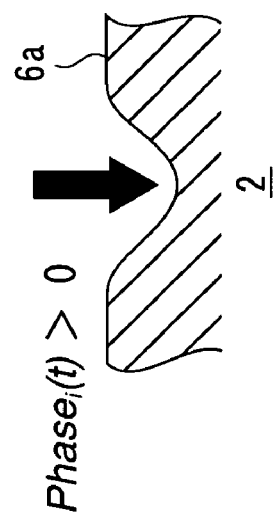
FIG. 5B illustrates the significance of phase information obtained by the analyzer.

Here, $d_i$ is a constant determined by calibration, and phase information $Phase_i(t)$ shows a direction of the touch, such as whether the touch is from above or below the sensor unit 5$i$, for example. For example, a positive $Phase_i(t)$, as in the case of FIG. 5B, indicates the direction of the touch is downward, while a negative $Phase_i(t)$, as in the case of FIG. 5C, indicates an upward touch direction. The LPF utilizes trigonometric function orthogonality to cut frequencies other than the cutoff frequency $F_{cut}$Hz out of components other than frequency $f_i$. The cutoff frequency $f_{cut}$ is determined according to the scale of the input to the touch sensor 2, and must satisfy the following condition.

$$2f_{cut} < f_i, \quad f_n = \pi f_i \quad (8)$$

The value of the frequency $f_i$ can be increased if it is required to detect amplitude and high frequencies.

(Automatic Gain Control)

Figure 6:
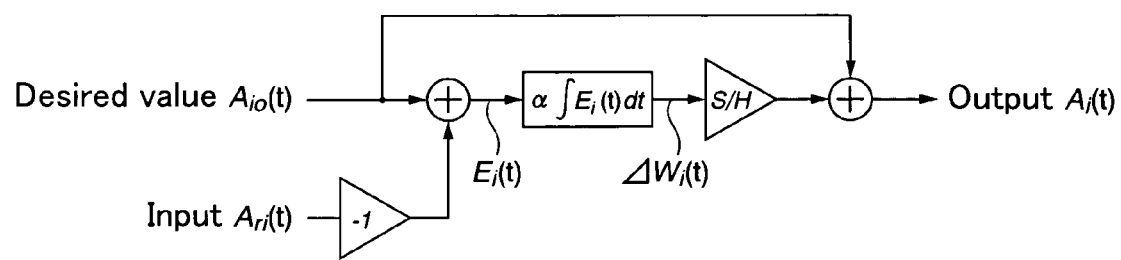
FIG. 6 is a block diagram illustrating processing of the AGC shown in FIG. 1.

The object of the AGC 9 is to automatically prevent saturation of the A/D converter 7 and the like, and to adjust the resolution of the tactile information. To explain this with reference to the FIGS. 4 and 6, the AGC 9 performs the following operation to adjust the voltage amplitude $A_i(t)$ applied to the sensor unit 5$i$ to an appropriate value.

$$E_i(t) = A_{ri}(t) - A_{io}(t) \quad (9)$$

$$\Delta W_i(t) = \alpha \int_0^T E_i(t) dt \quad (10)$$

$$A_i(t) = A_{ri}(t) - \Delta W_i(t) \quad (11)$$

Here, $A_{ri}(t)$ is voltage amplitude measured at the ith measurement point, $A_{io}(t)$ is a target value at the ith measurement point, $E_i(t)$ is an error (difference) relative to the ith target voltage, $\Delta W_i(t)$ is an applied voltage correction amount, and $\alpha$ is a small constant. With reference to equation (10), integration is used to impart a high-frequency cutoff effect for smooth, continuous adjustment of errors that change frequently.

Figure 7:
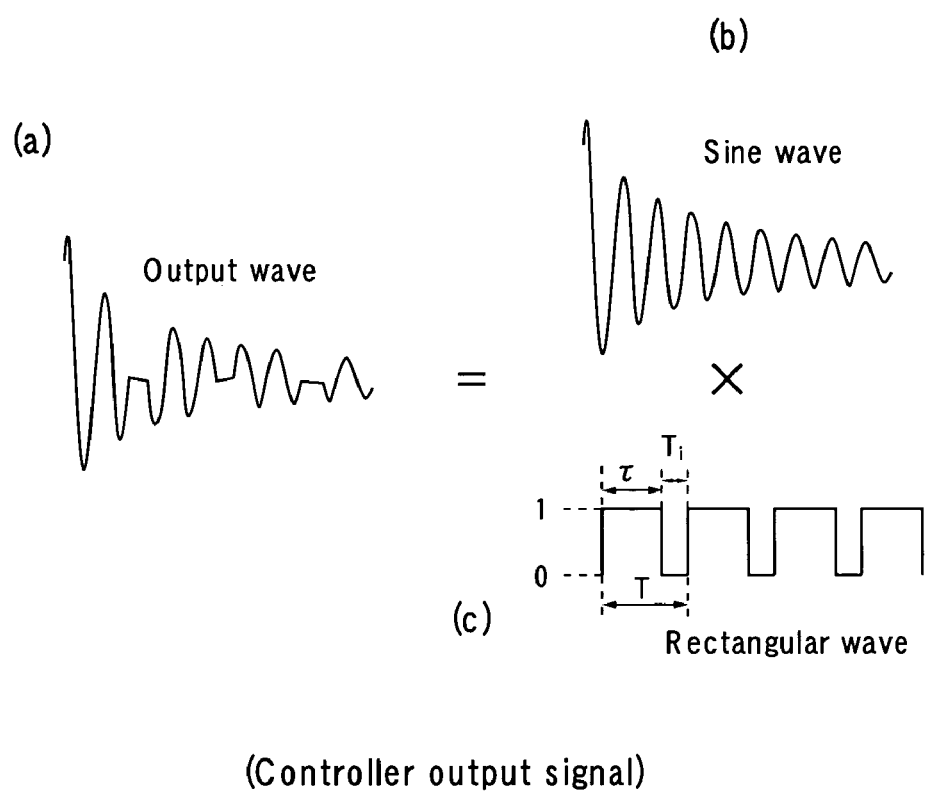
FIG. 7 shows signal waveform outputs from the D/A converter shown in FIG. 1.

Memory of the D/A converter 10 is rewritten to update the voltage amplitude $A_i(t)$ in accordance with the applied voltage correction amount $\Delta W_i(t)$. The D/A converter 10 can be associated with memory for high-speed sine wave generation, but memory rewrite time cannot be ignored. For example, when it is desired to output an ideal output waveform (b) shown in FIG. 7, the waveform actually output from the D/A converter 10 is a waveform (a) obtained by multiplying the ideal output waveform (b) by a rectangular wave (c). In FIG. 7, $T_i$ is the memory rewrite time of the D/A converter 10 and T is a rewrite update period.

EXAMPLES

Figure 8:
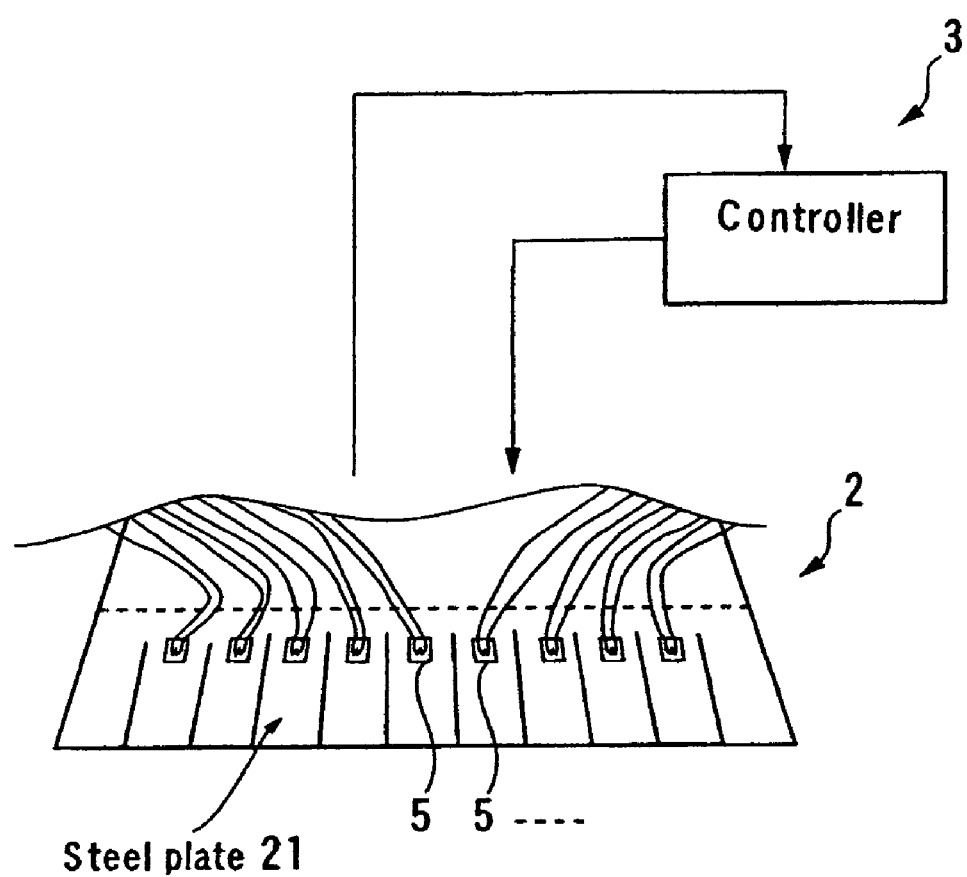
FIG. 8 illustrates a configuration of a touch sensor of a touch sensing system used in a test for confirming the effect of the present invention.

As shown in FIG. 8, a touch sensor 2 was fabricated by forming 1 mm cuts in a steel plate 21 to form a plurality of regions, in each of which a sensor unit 5 is located. Each sensor unit 5 included a bridge circuit 53 comprised of two strain gauges 51 and 52 adhered to a measurement point. An output of the bridge circuit 53 was temperature-compensated. A software-generated composite sine wave y(t) from a D/A converter 10 of a controller 3 was updated by a 30 kHz analogue output. Via analogue BPF 55, a single sine wave was applied to the bridge circuit 53 at each measurement point, and a secondary bi-cut type BPF 55 was used that was able to increase a quality factor to apply only a single sine wave to the bridge circuit 53. Regarding the BPF 55, due to device element variation, it is difficult to accurately align a center frequency with a set value, so a frequency of the sine wave output by the D/A converter 10 was aligned with the center frequency of the BPF 55. Each analogue BPF 55 was designed so that mutual interference portions were attenuated by at least 100 dB. The output from each measurement point was amplified approximately 1000-fold by an instrumentation amplifier 54. To enable signal outputs from the touch sensor 2 to be handled by just one line, the outputs from the sensor units 5 are added by an adding circuit 56 to generate an amplitude-modulated, frequency-multiplexed signal. The signal output by the touch sensor 2 is sampled at 5 kHz by an A/D converter 7. Digital LPF with a cutoff frequency of 50 Hz used by an analyzer 8 that obtains a correlation between sine wave and cosine wave was designed with third-order Butterworth characteristics. In the test, to make τ/T approximately 1.0, a gain update period T of 250 ms was used; the test was conducted at τ/T=0.80. Actual measurement was carried out in a stable period following memory update.

Figure 9A:
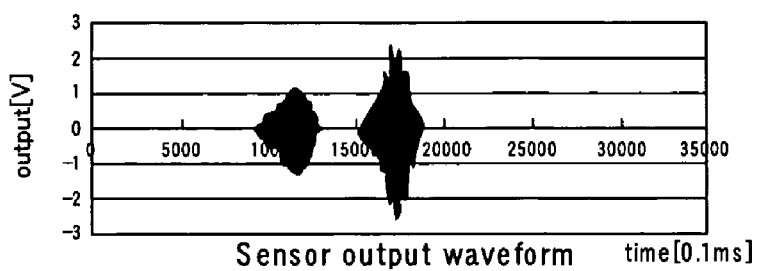
FIG. 9A is a graph of a touch sensor signal waveform output obtained when no automatic gain control is used.
Figure 9B:
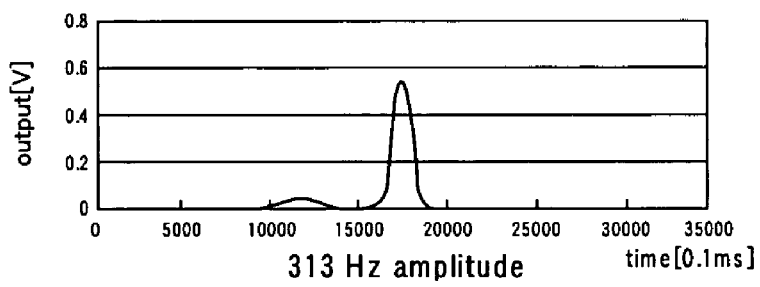
FIG. 9B is a graph of a touch sensor signal waveform output obtained when no automatic gain control is used.
Figure 9C:
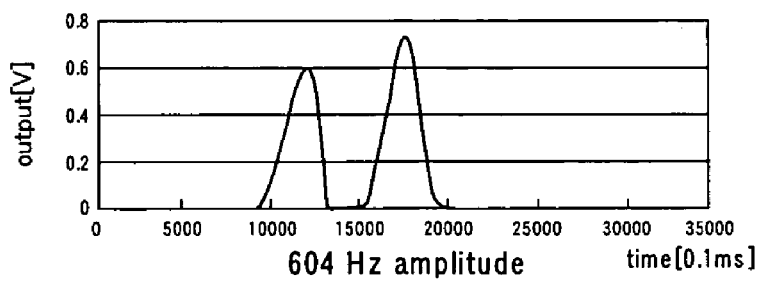
FIG. 9C is a graph of a touch sensor signal waveform output obtained when no automatic gain control is used.

FIG. 9 shows the results of the test conducted in respect of two measurement points, without automatic gain control. The D/A converter 10 applied sine waves of 313 Hz and 604 Hz to the sensor units (strain gauges). For the measurement, first a measurement point to which the 604 Hz sine wave was applied was touched, after which both measurement points were touched at the same time. FIG. 9A shows the waveform of the output from the touch sensor 2, and FIGS. 9B and 9C show data obtained after processing by the analyzer 8. These figures show data obtained when the sensor unit to which the 604 Hz sine wave was applied were touched with t=0.9 to 1.3 sec, and when both sensor units were touched with t=1.5 to 1.9 sec. FIG. 9B shows a slight output, even though there was no signal input from 0.9 to 1.2 sec. This was probably due to the fact that in the BPF 55 with the center frequency of 604 Hz, there was insufficient attenuation at frequency of 313 Hz when there was a high applied voltage or input displacement.

Figure 10A:
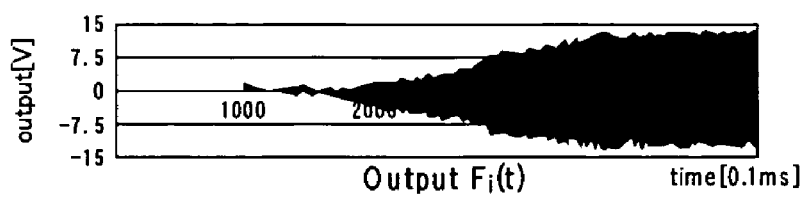
FIG. 10A is a graph of a touch sensor signal waveform output when no automatic gain control is used.
Figure 10B:
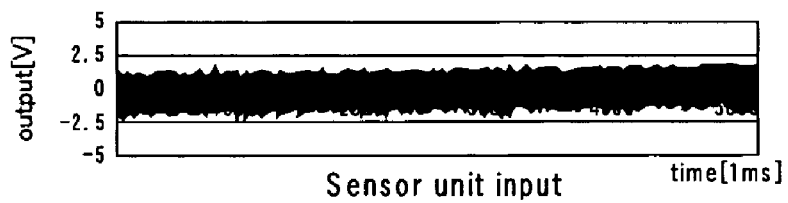
FIG. 10B is a graph of a touch sensor signal input to the touch sensor in the case of FIG. 10A.

FIGS. 10A and 10B show when automatic gain control was not used and the fixed-gain touch sensor 2 became saturated. FIG. 10A shows a signal output from a single measurement point, and FIG. 10B shows the applied voltage from the D/A converter 10 supplied to a single measurement point. FIG. 10A shows that the A/D converter 7 became saturated after t=3900 ms.

Figure 11A:
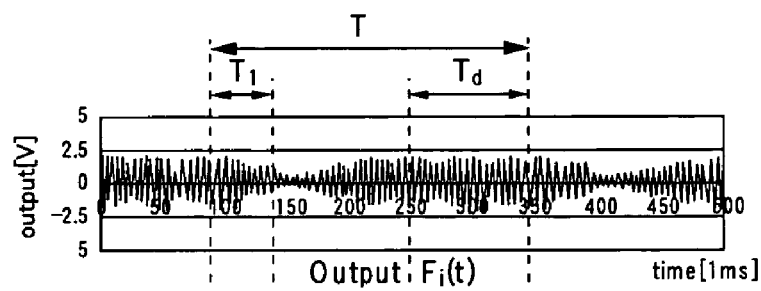
FIG. 11A is a graph of a signal waveform output of the touch sensor when automatic gain control is used.
Figure 11B:
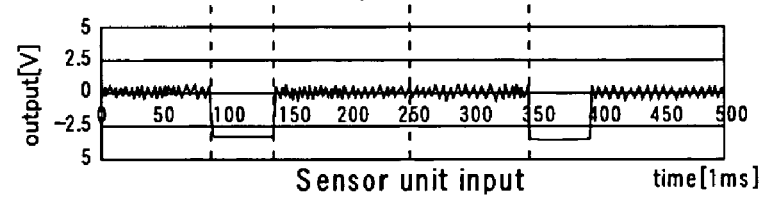
FIG. 11B is a graph of a touch sensor signal input.
Figure 11C:
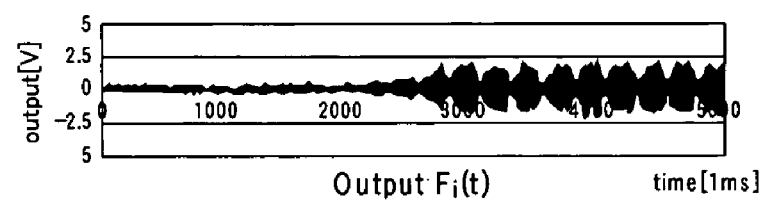
FIG. 11C is a graph of a touch sensor signal waveform output when automatic gain control is used.
Figure 11D:
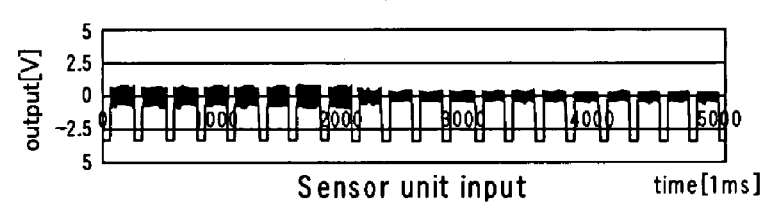
FIG. 11D is a graph of a touch sensor signal input.

When automatic gain control was used, FIGS. 11A to 11D show the results when the gain of the touch sensor 2 was reduced as the touch force increased gradually. FIG. 11D shows the signal output from a single measurement point, and FIGS. 11A and 11B are partially enlarged views of FIGS. 11C and 11D, respectively. In FIG. 11A, T is the gain update period of the AGC 9, $T_d$ is an effective measurement period of the sensor, and $T_i$ is the memory rewrite time of the D/A converter 10. Taking into consideration function lag introduced by the BPF and LPF, a measurement period $T_d$ was provided after $T_i$ to allow the system to stabilize. From FIGS. 11C and 11D, it can be seen that the gain of the sensor unit 5 decreased in accordance with the touch pressure.

What is claimed is:

1. A method for detecting tactile information on touch force acting on measurement points, based on outputs from bridge circuits constituted by strain gauges adhered to each measurement point, comprising:

generating a composite sine wave signal that contains sine wave components having different frequencies;

applying the composite sine wave signal to each bridge circuit via a bandpass filter to apply to each bridge circuit a sine wave signal of a predetermined single frequency;

adding outputs from each bridge circuit to generate a sum output;

from the sum output, utilizing trigonometric function orthogonality to obtain at least touch force of touch force and touch direction acting on each measurement point;

comparing voltage amplitude measured at each measurement point to a reference voltage preset for each measurement point and adjusting the voltage amplitude of the sine wave signal of each frequency applied to the bridge circuit of each measurement point to control the gain of the bridge circuit of each measurement point to reduce any difference between measured and reference voltages.

2. A system for detecting tactile information on touch force acting on measurement points according to the method of claim 1, comprising:

a touch sensor, a controller, a signal output line for supplying the sum output of the touch sensor to the controller, and a gain control line for supplying the composite sine wave signal output from the controller to the touch sensor;

the touch sensor including a plurality of sensor units, and an adding circuit for generating the sum output by adding the output from each sensor unit;

each touch sensor including a bridge circuit constituted by a plurality of strain gauges disposed at a measurement point, and a bandpass filter for applying to the bridge circuit a sine wave signal of a predetermined single frequency included in the composite sine wave signal;

the controller including an A/D converter for A/D conversion of the sum output supplied via the signal output line, an analyzer that, from the sum output converted by the A/D converter, of the touch force and touch direction acting on each measurement point, utilizes trigonometric function orthogonality to obtain at least the touch force acting on each measurement point, an automatic gain control circuit that compares voltage amplitude measured at each measurement point to a reference voltage preset for each measurement point and adjusts the voltage amplitude of each sine wave signal frequency applied to each sensor unit of the touch sensor to reduce any difference between the measured and reference voltages, and a D/A converter that generates and outputs the composite sine wave that includes the sine wave signals of each frequency with the adjusted voltage amplitude.

* * * * *